United States Patent
Qin et al.

(10) Patent No.: US 12,098,464 B2
(45) Date of Patent: Sep. 24, 2024

(54) PREPARATION METHOD OF CARBON NITRIDE ELECTRODE MATERIAL

(71) Applicant: Shaanxi University of Science & Technology, Xi'an (CN)

(72) Inventors: Jiani Qin, Xi'an (CN); Bao Pan, Xi'an (CN); Chuanyi Wang, Xi'an (CN)

(73) Assignee: Shaanxi University of Science & Technology, Xi'an (CN)

(*) Notice: Subject to any disclaimer, the term of this patent is extended or adjusted under 35 U.S.C. 154(b) by 728 days.

(21) Appl. No.: 17/315,794

(22) Filed: May 10, 2021

(65) Prior Publication Data
US 2022/0073349 A1  Mar. 10, 2022

(30) Foreign Application Priority Data
Sep. 7, 2020 (CN) .......................... 202010931509.3

(51) Int. Cl.
*C23C 18/12* (2006.01)
*C03C 17/22* (2006.01)
*C23C 18/04* (2006.01)

(52) U.S. Cl.
CPC ........ *C23C 18/1279* (2013.01); *C03C 17/225* (2013.01); *C23C 18/04* (2013.01); *C23C 18/1204* (2013.01); *C03C 2218/111* (2013.01); *C03C 2218/326* (2013.01)

(58) Field of Classification Search
CPC ................................................. C23C 18/1204
See application file for complete search history.

(56) References Cited

U.S. PATENT DOCUMENTS 6,099,877 A * 8/2000 Schuppan ............... C11C 5/008
426/104
2004/0245529 A1* 12/2004 Yamazaki ............... H01L 33/46
257/79

FOREIGN PATENT DOCUMENTS

CN   103755383 B  *  4/2016
CN   106848494 B  *  6/2019

OTHER PUBLICATIONS

CN103755383B, machine translation. (Year: 2014).*
CN106848494B (Year: 2017).*

* cited by examiner

*Primary Examiner* — Robert A Vetere

(57) ABSTRACT

The invention discloses a preparation method of a carbon nitride (CN) electrode material. The preparation method comprises the following steps: (1) preparing a precursor film: immersing a clean conductive substrate A into a hot saturated CN precursor aqueous solution, then immediately taking out, after the surface being dried, a uniform precursor film layer on the conductive substrate A was formed. This step can be repeated several times to get different layers of precursor film on the substrate A; (2) preparing the CN electrode: the dry precursor film obtained in step (1) was encapsulated in a glass tube filled with $N_2$. Then the glass tube was inserted into a furnace with $N_2$ atmosphere to calcinate. After calcination, the uniform CN film electrode was obtained. The method provided by the invention is simple and easy to implement, and convenient in used equipment, suitable for industrial application and popularization.

5 Claims, 4 Drawing Sheets

US 12,098,464 B2

PREPARATION METHOD OF CARBON NITRIDE ELECTRODE MATERIAL

CROSS REFERENCE TO RELATED APPLICATION

The invention relates to the technical field of electrode material preparation, in particular to a preparation method of a carbon nitride electrode material.

BACKGROUND OF THE INVENTION

Carbon nitride (CN) has been widely concerned as a photoelectric material in recent years due to its non-metallic property, non-toxic property, good stability, suitable energy band structure, and low price, and has great application prospects in the fields of energy and environment. However, the preparation methods of traditional CN electrodes have great limitations. For example, the prepared CN films are not uniform, uncontrollable in thickness, and poor in the contact with the substrate. Each method only allows a specific monomer as a precursor for a CN material, and most of these methods are only applicable to a single substrate and cannot be extended to other substrates. In addition, some methods have complex and harsh synthesis conditions, which seriously affect their practical applications. Therefore, there is an urgent need to develop a simple, efficient and universal preparation method for CN electrode sheets, thereby finally realizing the practical application of CN photoelectric catalytic materials in the fields of energy and environment.

SUMMARY OF THE INVENTION

In order to overcome the above-mentioned shortcomings of the prior art, the objective of the invention is to provide a preparation method of a carbon nitride electrode material. The proposed method is simple and easy to implement, cheap, simple and convenient in used equipment, suitable for industrial development and beneficial for popularization.

To achieve the objective, the invention adopts the following technical scheme:

A preparation method of a carbon nitride electrode material includes the following steps:

(1) Preparing a precursor film: vertically and rapidly immersing a clean conductive substrate A into a hot saturated CN precursor aqueous solution, then immediately taking out the conductive substrate A, forming a uniform precursor film layer on the conductive substrate A after the surface being dried, adjusting the thickness of the precursor film layer by repeating the above steps for many times of dipping and drying cycles to form multiple layers, and naturally air-drying or drying the obtained precursor film in a 60° C. drying oven for later use;

(2) Preparing the CN electrode: putting the dry precursor film obtained in step (1) into a glass tube, introducing nitrogen gas to discharge air in the tube, binding the tube opening with tin foil paper, then putting the glass tube into a furnace with $N_2$ atmosphere to calcinate at a high temperature, and naturally cooling to obtain the uniform CN film electrode.

The temperature of the saturated solution in the step (1) is determined by the actual solubility of the precursor in water. The temperature is 60-120° C., and different precursors may be extended to a wider range of temperature.

In the step (1), the CN precursor is a monomer with higher solubility in hot water or a monomer with lower solubility.

The monomers with higher solubility are thiourea, urea, ammonium thiocyanate or guanidine carbonate, with the solubility in water at 70° C. of about 0.9 g mL$^{-1}$, 2.4 g mL$^{-1}$, 4.6 g mL$^{-1}$, and 0.7 g mL$^{-1}$, respectively.

The monomer with lower solubility is dicyandiamide, with the solubility in water at 70° C. of about 0.3 g mL$^{-1}$. The conductive substrate needs to be pre-treated with the dicyandiamide as the precursor. The pre-treatment is specifically proceeded as follows. The clean conductive substrate is firstly immersed into a dicyandiamide-saturated methanol solution at the room temperature for ten seconds and subsequently taken out. After being dried, they are vertically immersed into a hot dicyandiamide-saturated aqueous solution and taken out immediately, yielding a more uniform dicyandiamide film on the substrate.

The conductive substrate A in the step (1) can be a commonly used conductive substrate such as fluorine-doped $SnO_2$ conductive glass (FTO), indium tin oxide conductive glass (ITO), carbon paper, or an FTO electrode coated with a $TiO_2$ film.

In the step (2), the reaction temperature of the furnace with $N_2$ atmosphere is 450-600° C. The high-temperature calcination lasts for 2-4 h, and the heating rate is 2-40° C. min$^{-1}$. Different substrates and precursors may be expanded to a wider range and should be adjusted according to the actual conditions of the specific substrates and precursors.

The CN film electrode is applied in the field of energy and environment.

The beneficial effects of the invention are as follows:

(1) The preparation technology of the invention is simple and easy to implement, does not require complex and expensive equipment, is environmentally friendly, has no secondary pollution, and has mild reaction conditions.

(2) The CN electrode film synthesized by the invention is uniform, has a controllable thickness, and is in intimate contact with the substrate.

(3) The preparation method of the invention has universal applicability, is suitable for a variety of monomers and a variety of substrates, and can also be extended to the preparation of other thin film materials in addition to the CN material.

(4) The CN electrode prepared by the invention exhibits excellent photoelectrochemical performance.

DETAILED DESCRIPTION OF THE PREFERRED EMBODIMENTS

The invention will be further described in detail below in conjunction with the Embodiments.

Embodiment 1

Figure 1:
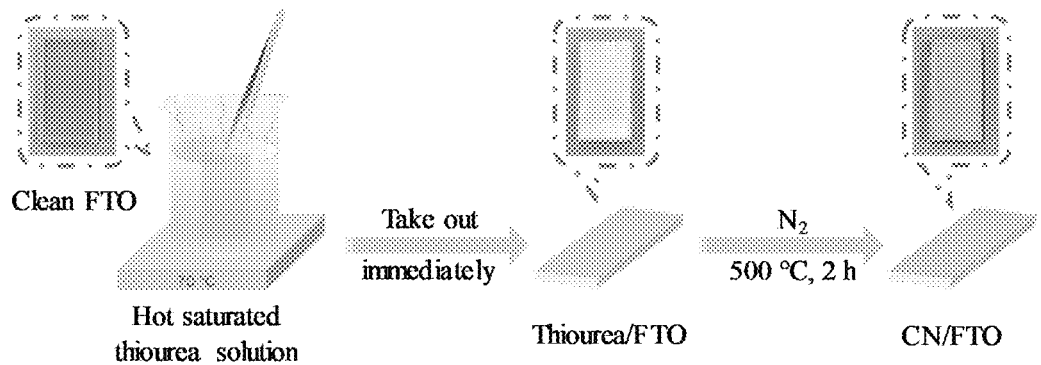
FIG. 1 is a preparation technology roadmap of Embodiment 1 of the invention (the corresponding objective picture is in a dashed line).
Figure 2:
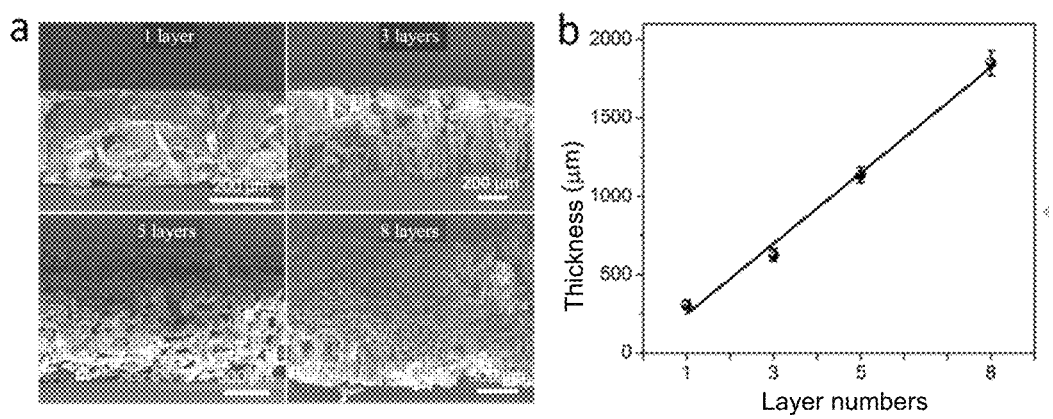
FIG. 2 is a cross-sectional SEM image (a) showing a thiourea film with different thicknesses on the FTO substrate prepared in Embodiment 1 of the invention and a relationship curve (b) between the number of layers and the thickness. Error bars represent standard deviation.
Figure 3:
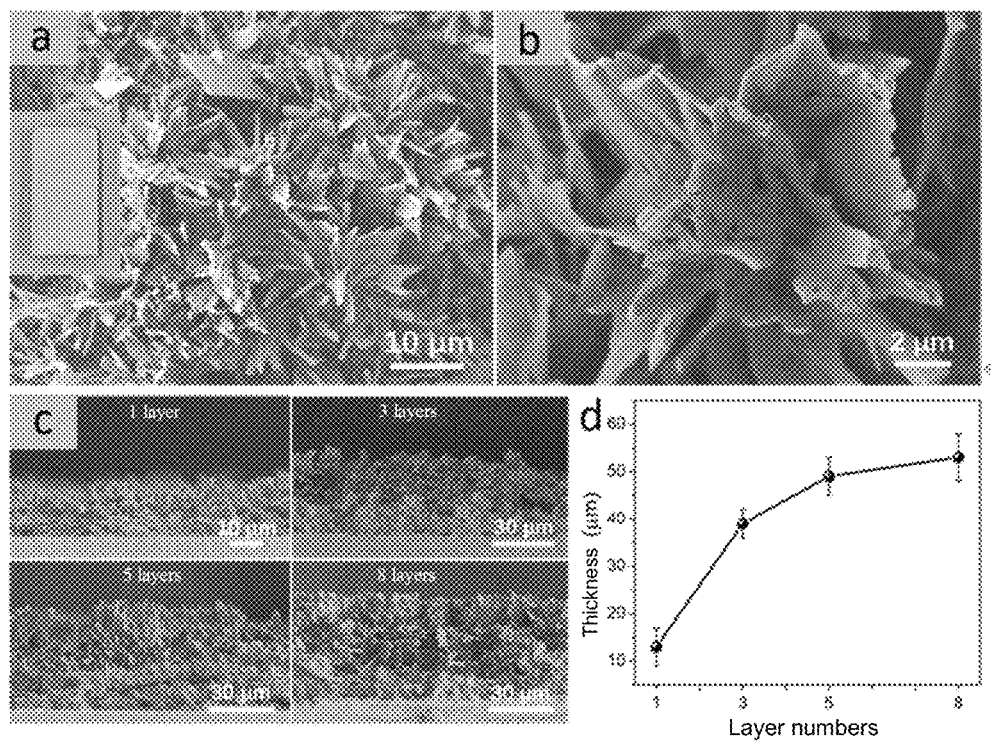
FIG. 3 is SEM images (a-c) of the CN electrode obtained after calcination with thiourea as the precursor in Embodiment 1 of the invention and the relationship curve (d) between the thickness of the CN film and the number of layers of the corresponding thiourea film. Error bars represent standard deviation.

The thiourea powder was added into a glass bottle containing 20 ml of deionized water and was heated to 70° C. while stirred. After the solution was saturated, a clean FTO glass sheet was quickly immersed into the hot saturated solution and was subsequently taken out immediately, yielding a uniform film layer of thiourea on the FTO after the surface was dried. The thickness of the thiourea film could be tuned by repeating dipping-drying cycles for many times to separately prepare thiourea films with different number of layers (1, 3, 5 and 8). The thiourea film was dried in a 60° C. oven or dried naturally under air. The above-mentioned dried thiourea film was put into a glass tube, the opening of which was bound with tin foil paper after nitrogen gas was introduced to discharge air in the tube. The glass tube was put into a furnace with $N_2$ atmosphere and heated for 2 h at 500° C. with a rate of 5° C. min$^{-1}$, resulting a uniform CN film electrode after natural cooling. CN film electrodes with different thicknesses could be obtained after thiourea precursor films with different number of layers were calcined (FIGS. 1-3).

Figure 4:
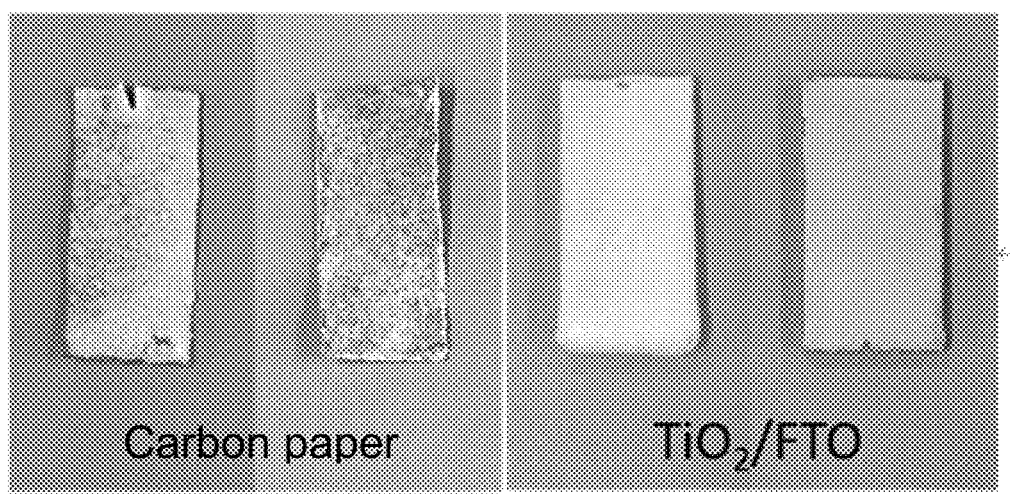
FIG. 4 is a photo of the thiourea film (left) on different substrates and the CN electrode (right) obtained after calcination in Embodiment 1 of the invention.

Thiourea films and corresponding CN film electrodes on different substrates were prepared by taking carbon paper and the FTO electrode coated with the $TiO_2$ film as the substrate to replace the blank FTO substrate. (FIG. 4)

Figure 5:
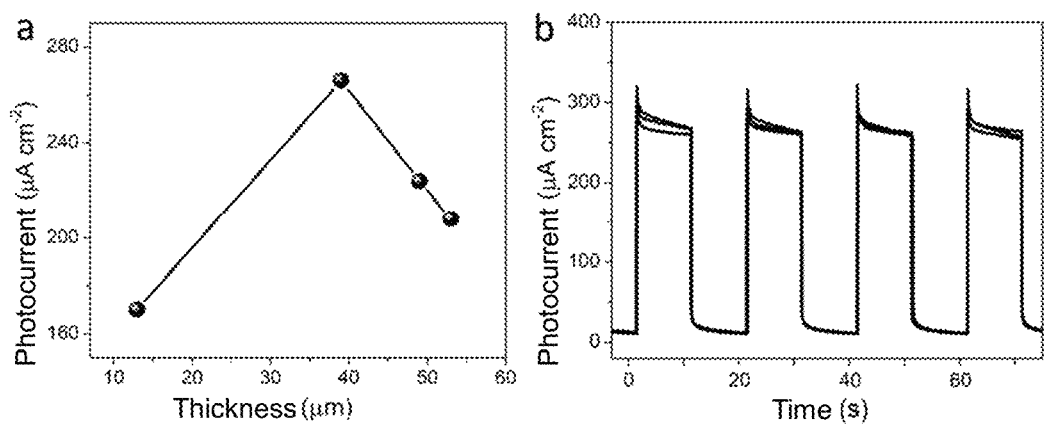
FIG. 5 shows the photoelectrochemical performance (a) of CN film electrodes of different thicknesses prepared with thiourea as the precursor in Embodiment 1 of the invention and the repeatability (b) of the photoelectrochemical performance of CN film electrodes prepared in different batches.

Photoelectrochemical performance test: the photoelectrochemical performance of the synthesized CN electrode was tested under irradiation simulating sunlight intensity by using the prepared CN film electrode as the working electrode (anode), using the platinum sheet electrode as the counter electrode, using Ag/AgCl as the reference electrode, and using 0.1 M KOH as the electrolyte. (FIG. 5)

Figure 6:
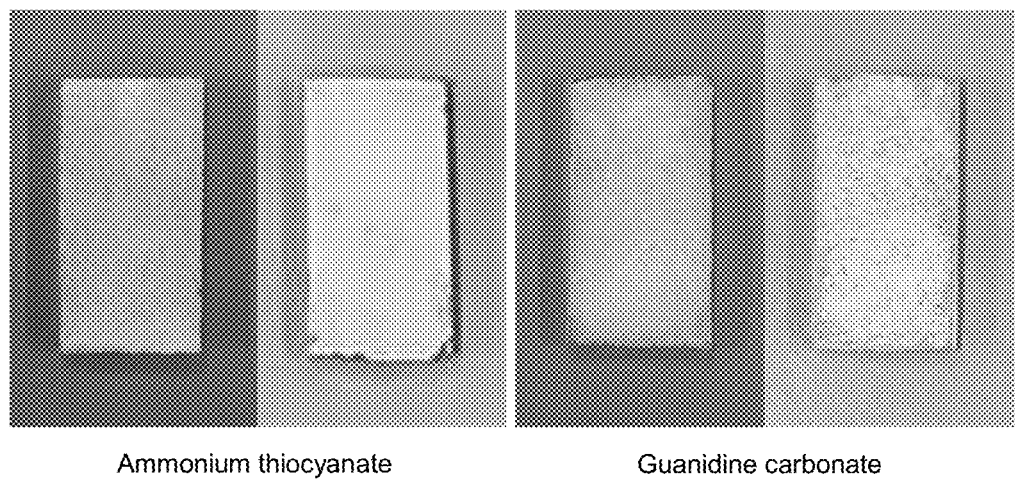
FIG. 6 is a photo of different precursor films (left)-ammonium thiocyanate and guanidine carbonate on the FTO substrate in Embodiment 1 of the invention and the corresponding CN electrode (right) obtained after calcination.

Ammonium thiocyanate and guanidine carbonate were respectively dissolved in 20 ml of 70° C. aqueous solution until saturated, and the corresponding ammonium thiocyanate film and guanidine carbonate film were obtained on the FTO according to the above steps. After calcination, the corresponding CN electrode was obtained. (FIG. 6)

Embodiment 2

Figure 7:
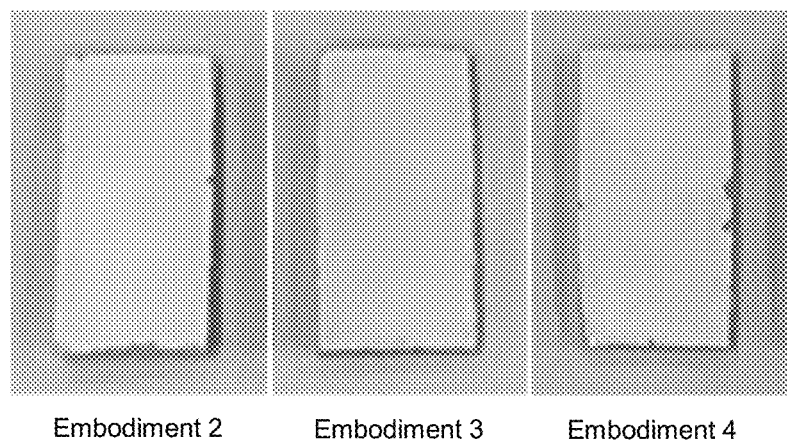
FIG. 7 is a CN electrode synthesized under different conditions using FTO as the substrate and thiourea as the precursor in Embodiments 2-4.

The thiourea powder was added into a glass bottle containing 20 ml of deionized water and was heated to 60° C. while stirred. After the solution was saturated, a clean FTO glass sheet was quickly immersed into the hot saturated solution and was taken out immediately yielding a uniform film layer of thiourea on the FTO after the surface was dried. The thiourea film was dried in a 60° C. oven or dried naturally under air. The above-mentioned dried thiourea film was put into a glass tube, the opening of which was bound with tin foil paper after nitrogen gas was introduced to expel air in the tube. The glass tube was put in a furnace with $N_2$ atmosphere for high-temperature calcination at 450° C. for 4 h at a heating rate of 2° C. min$^{-1}$, and a uniform CN film electrode was obtained after being naturally cooled. (FIG. 7)

Embodiment 3

The thiourea powder was added into a glass bottle containing 20 ml of deionized water and was heated to 120° C. while stirred. After the solution was saturated, a clean FTO glass sheet was quickly immersed into the hot saturated solution and was taken out immediately yielding a uniform film layer of thiourea on the FTO after the surface was dried. The thiourea film was dried in a 60° C. oven or naturally under air. The above-mentioned dried thiourea film was put into a glass tube, the opening of which was bound with tin foil paper after nitrogen gas was introduced to discharge air in the tube. The glass tube was put into a furnace with $N_2$ atmosphere and heated for 3 h at 550° C. with a rate of 40° C. min$^{-1}$, resulting a uniform CN film electrode after natural cooling. (FIG. 7)

Embodiment 4: The three-layer thiourea film obtained in Embodiment 1 was put into a glass tube, the opening of which was bound with tin foil paper after nitrogen gas was introduced to discharge air in the tube. The glass tube was put into a furnace with $N_2$ atmosphere and heated for 2 h at 600° C. with a rate of 10° C. min$^{-1}$, resulting a uniform CN film electrode after natural cooling. (FIG. 7).

Embodiment 5

Figure 8:
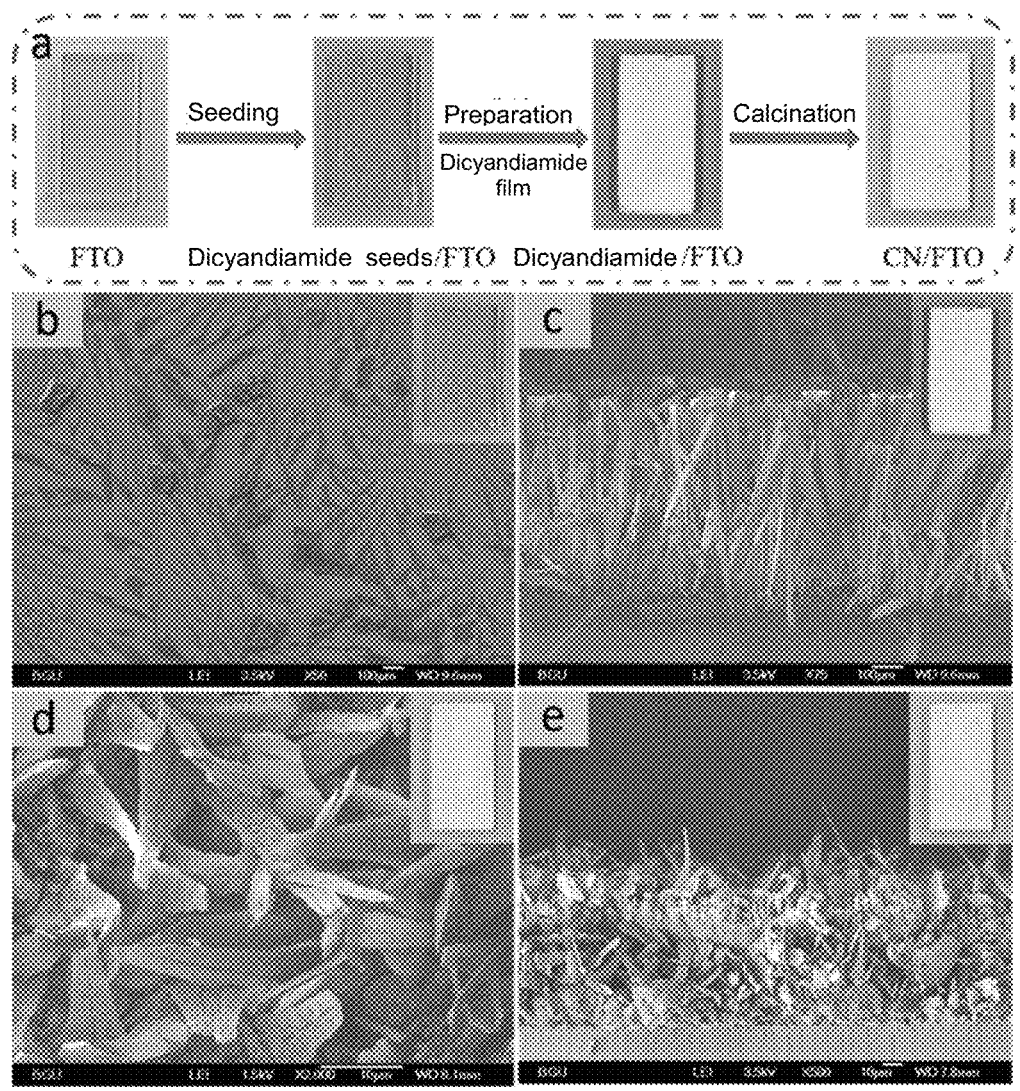
FIG. 8 is a technology roadmap of preparing the CN electrode with dicyandiamide as a precursor on the FTO substrate in Embodiment 5 of the invention, as well as the physical photos (a) and corresponding SEM images (b-e) of the film before and after calcination.

The dicyandiamide powder was added to 10 ml of a room-temperature methanol solution until it was saturated, then the clean FTO glass was vertically immersed into the saturated methanol solution for 10 s and then taken out for later use after the methanol was dried, namely a FTO glass sheet containing dicyandiamide seeds. The dicyandiamide powder was added into a glass bottle containing 20 ml of deionized water and was heated to 70° C. while stirred, then treated FTO glass sheet containing dicyandiamide seeds was quickly and vertically immersed into the hot saturated dicyandiamide aqueous solution and then was immediately taken out after saturation, resulting a uniform film layer of dicyandiamide on the FTO after the surface was dried. The film layer of dicyandiamide was dried in a 60° C. oven or dried naturally under air. The rest of the steps were the same with the steps in Embodiments 1-4. As shown in FIG. 8, taking dicyandiamide as a precursor, A CN film electrode was obtained after a calcination step at 500° C. for 4 h with a rate of 20° C. min$^{-1}$.

As shown in FIG. 1: the clean FTO glass was immersed into a hot thiourea-saturated aqueous solution to form a uniform thiourea film on the FTO, and a uniform CN film electrode was obtained by high-temperature calcination.

As shown in FIG. 2: according to different immersion times, the thiourea film with 1, 3, 5 and 8 layers was formed on the FTO respectively. It could be seen from the cross-sectional view of FIG. a that the thiourea films were uniform in thickness, and were in intimate contact with a FTO substrate. FIG. b showed the thicknesses the thiourea film with different layers.

As shown in FIG. 3: the CN electrode prepared with thiourea as the precursor had a uniform morphology and a porous nanosheet structure (FIGS. a-b). FIG. c showed that the CN film with uniform thickness could be obtained by calcining the thiourea precursor film, and was in intimate contact with the substrate FTO. The thickness of the CN film electrode obtained after calcining the thiourea film with different layers was different. The relationship between the specific thickness of the CN film and the number of the layers of the thiourea films was shown in FIG. d.

As shown in FIG. 4: carbon paper and FTO coated with the $TiO_2$ film were taken as substrates to separately obtain the uniform thiourea film (left) and CN film electrode (right).

As shown in FIG. 5: the CN/FTO electrode prepared with thiourea as the precursor showed excellent photoelectrochemical performance. FIG. a showed that the photocurrent density of CN thin-film electrodes of different thicknesses was different, where the 39 μm CN film electrode prepared by the thiourea film with three layers had the highest photocurrent density. FIG. b showed that the photocurrent curves of the CN film electrodes prepared in three different batches with the thiourea film having three layers as the precursor overlapped well, indicating that the preparation technology had good repeatability.

As shown in FIG. 6: ammonium thiocyanate and guanidine carbonate were separately used as precursors respectively, the precursor film (left) and the CN film (right) could be obtained on FTO by this preparation process.

As shown in FIG. 7: uniform CN electrodes were prepared with thiourea as the precursor by adjusting the temperature of the saturated solution, the heating rate, the calcination temperature and the calcination time.

As shown in FIG. 8: FIG. a showed the preparation process of the CN electrode prepared with dicyandiamide as the precursor. By immersing the FTO into a saturated dicyandiamide methanol solution, a thin layer of dicyandiamide seeds was formed on the FTO, then the FTO containing the seed layer was immersed into a hot saturated dicyandiamide aqueous solution to obtain a uniform dicyandiamide film, and uniform CN electrode was obtained after uniform dicyandiamide film was calcined. FIG. b showed that the whole FTO was fully covered with a thin layer of dicyandiamide seeds. FIG. c was a cross-sectional SEM image of the dicyandiamide film, showing that the dicyandiamide precursor grew vertically on the FTO and was in intimate contact with the FTO. FIG. d showed that the CN membrane prepared with dicyandiamide as the precursor had a uniform morphology, similar to the leaves of plants in grass. FIG. e was a cross-sectional SEM image of the CN film, showing its uniform thickness and intimate contact with FTO.

What is claimed is:

1. A preparation method of a carbon nitride electrode material, characterized by comprising the following steps:
   (1) Preparing a precursor film: vertically immersing a clean conductive substrate A into a saturated CN precursor aqueous solution, then immediately taking out the conductive substrate A, forming a uniform precursor film layer on the conductive substrate A; after the surface has been dried, adjusting the thickness of the precursor film layer by repeating the above steps of dipping and drying cycles for many times to form multiple layers, and air-drying or drying the obtained precursor film in a 60° C. drying oven for later use;
   (2) Preparing the CN electrode: putting the dry precursor film obtained in step (1) into a glass tube, introducing nitrogen gas to discharge air in the glass tube, binding the glass tube opening with tin foil paper, then putting the glass tube into a furnace with $N_2$ atmosphere to calcinate at a temperature, and cooling to obtain the uniform CN film electrode.

2. The preparation method of the carbon nitride electrode material according to claim 1, wherein the temperature of the saturated solution in the step (1) is determined by the actual solubility of the precursor in water, the temperature is 60-120° C., and different precursors may be extended to a wider range of temperature.

3. The preparation method of the carbon nitride electrode material according to claim 1, wherein the precursor is thiourea, urea, ammonium thiocyanate or guanidine carbonate, with the solubility in water at 70° C. of about 0.9 g·mL$^{-1}$, 2.4 g·mL$^{-1}$, 4.6 g·mL$^{-1}$, and 0.7 g·mL$^{-1}$, respectively.

4. The preparation method of the carbon nitride electrode material according to claim 1, wherein the conductive substrate A in the step (1) includes fluorine-doped $SnO_2$ conductive glass (FTO), indium tin oxide conductive glass (ITO), carbon paper, or an FTO electrode coated with a $TiO_2$ film.

5. The preparation method of the carbon nitride electrode material according to claim 1, wherein in the step (2), the reaction temperature of the furnace with $N_2$ atmosphere is 450-600° C., the high-temperature calcination lasts for 2-4 h, and the heating rate is 2-40° C.·min$^{-1}$.

* * * * *